United States Patent
Han et al.

(10) Patent No.: US 12,216,605 B2
(45) Date of Patent: Feb. 4, 2025

(54) ELECTRONIC DEVICE

(71) Applicant: HARMAN INTERNATIONAL INDUSTRIES, INCORPORATED, Stamford, CT (US)

(72) Inventors: Yanmei Han, Guangdong (CN); Ebing Shen, Guangdong (CN); Tieyi Liang, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 53 days.

(21) Appl. No.: 18/112,906

(22) Filed: Feb. 22, 2023

(65) Prior Publication Data

US 2023/0325340 A1  Oct. 12, 2023

(30) Foreign Application Priority Data

Mar. 24, 2022 (CN) .......................... 202220659565.0

(51) Int. Cl.
G06F 13/00 (2006.01)
G06F 1/26 (2006.01)
G06F 13/40 (2006.01)

(52) U.S. Cl.
CPC .......... *G06F 13/4081* (2013.01); *G06F 1/266* (2013.01)

(58) Field of Classification Search
CPC ... G06F 13/4081; G06F 1/266; G06K 7/0013; G06K 7/0082; G06K 19/0701
See application file for complete search history.

(56) References Cited

U.S. PATENT DOCUMENTS

| 8,639,863 | B1* | 1/2014 | Kanapathippillai ........................ G06F 13/1684 710/62 |
| 2005/0156041 | A1* | 7/2005 | Wurzburg ........ G06K 19/07732 235/441 |
| 2019/0384943 | A1* | 12/2019 | Rotsaert ............... G06K 7/0069 |
| 2023/0004765 | A1* | 1/2023 | Shiau .................... G06K 13/08 |

FOREIGN PATENT DOCUMENTS

| CN | 202551148 U | 11/2012 |
| EP | 2511851 A2 | 10/2012 |
| EP | 2852130 A1 | 3/2015 |

OTHER PUBLICATIONS

European Search Report dated Aug. 3, 2023 for European Patent Application No. 23157695.0, 9 pages.

* cited by examiner

*Primary Examiner* — Henry Tsai
*Assistant Examiner* — Kim T Huynh
(74) *Attorney, Agent, or Firm* — Brooks Kushman P.C.

(57) ABSTRACT

Disclosed is an electronic device, including: a switch element; and a memory card slot suitable for receiving a memory card. The memory card slot includes a power supply pin and a detection pin, and the power supply pin of the memory card slot being connected to a power supply through the switch element. The memory card slot has a first configuration where a memory card is received and a second configuration where there is no memory card. In the first configuration of the memory card slot, the detection pin of the memory card slot is in a grounded state, and in the second configuration of the memory card slot, the detection pin of the memory card slot is in a non-grounded state. The detection pin of the memory card slot is connected to the switch element and the detection pin in the grounded state can turn on the switch element.

14 Claims, 1 Drawing Sheet

ELECTRONIC DEVICE

CROSS-REFERENCE TO RELATED APPLICATIONS

This application claims priority to CN application No. 202220659565.0 filed Mar. 24, 2022, the disclosure of which is hereby incorporated in its entirety by reference herein.

TECHNICAL FIELD

The present disclosure relates to an electronic device, in particular to an electronic device including a memory card slot.

BACKGROUND

Electronic devices, such as portable music players or video players, usually have memory card slots for receiving memory cards, such as TransFlash (TF) cards or Secure Digital (SD) cards. When in use, the memory card is inserted into the memory card slot of the electronic device for the electronic device to read audio files, video files, or other digital files from the memory card.

The memory card slot of the electronic device often uses a metal shell, so the memory card slot and the memory card inserted therein are usually easily affected by electrostatic discharge (ESD). In addition, during operation by a user of the electronic device, for example, during the insertion and removal of the memory card, the user's fingers often come into contact with the memory card in the memory card slot, which also causes the memory card slot and the memory card inserted therein to often experience electrostatic discharge (ESD).

The ESD may damage the controller of the electronic device or make the electronic device not be able to read data from the memory card normally. At present, to improve the reliability of the electronic device, two methods are usually used to improve the anti-static capacity: (1) well separating a digital ground, an analog ground, and a power ground of a circuit of the memory card slot; (2) adding ESD elements; and (3) adding magnetic bead elements. However, all the three methods will increase the design complexity of the circuit of the memory card slot, and repeated tests are needed to achieve a good anti-static capacity. These all increase the production and design cost of the electronic device.

Therefore, there is a need for a design of an electronic device and a memory card slot thereof, which can improve the anti-static capacity of the electronic device in a simple and low-cost way.

SUMMARY

The present disclosure aims to overcome at least some of the above-mentioned problems of the prior art.

According to one aspect of the present disclosure, an electronic device is provided, including: a switch element; and a memory card slot suitable for receiving a memory card, the memory card slot including a power supply pin and a detection pin, and the power supply pin of the memory card slot being connected to a power supply through the switch element, wherein the memory card slot has a first configuration in which a memory card is received and a second configuration in which there is no memory card; in the first configuration of the memory card slot, the detection pin of the memory card slot is in a grounded state, and in the second configuration of the memory card slot, the detection pin of the memory card slot is in a non-grounded state, wherein the detection pin of the memory card slot is connected to the switch element, the detection pin in the grounded state can turn on the switch element, and the detection pin in the non-grounded state can turn off the switch element. In the on state of the switch element, the power supply pin of the memory card slot is electrically connected to the power supply. In the off state of the switch element, the power supply pin of the memory card slot is not electrically connected to the power supply.

According to one or more embodiments of the present disclosure, the switch element has a first end, a second end, and a third end; the first end of the switch element is electrically connected to the power supply; the second end of the switch element is electrically connected to the power supply pin of the memory card slot; the third end of the switch element is electrically connected to the detection pin of the memory card slot; in the on state of the switch element, the first end of the switch element is electrically connected to the second end, and in the off state of the switch element, the first end of the switch element is not electrically connected to the second end; when the third end of the switch element is at a low level, the switch element is in the on state, and when the third end of the switch element is at a high level, the switch element is in the off state.

According to one or more embodiments of the present disclosure, the power supply is electrically connected to the third end of the switch element through a resistor.

According to one or more embodiments of the present disclosure, the switch element is a field effect transistor; the first end of the switch element is a source; the second end is a drain; and the third end is a gate.

According to one or more embodiments of the present disclosure, the detection pin of the memory card slot is grounded through a switch; in the first configuration of the memory card slot, the memory card in the memory card slot puts the switch at the on position; and in the second configuration of the memory card slot, the switch is at the off position.

According to one or more embodiments of the present disclosure, the electronic device further includes a controller connected with the memory card slot and capable of reading data from the memory card in the memory card slot.

According to one or more embodiments of the present disclosure, the controller includes a detection and reset pin; the detection and reset pin is connected to the third end of the switch element; the controller includes a normal reading state of being able to read data from the memory card in the memory card slot, and an abnormal reading state of being unable to read data from the memory card in the memory card slot; and in the abnormal reading state, the controller applies a high level to the third end of the switch element through the detection and reset pin.

According to one or more embodiments of the present disclosure, the memory card slot is a slot suitable for receiving a TF card or an SD card.

According to one or more embodiments of the present disclosure, the electronic device is a portable audio player or video player.

According to one or more embodiments of the present disclosure, the controller is connected to a plurality of pins of the memory card slot, and is used to communicate with the memory card in the memory card slot through the plurality of pins; the electronic device also includes a plurality of ESD elements; each of the plurality of pins of the memory card slot is grounded through one of the ESD elements, and/or the power supply pin of the memory card slot is grounded through one of the ESD elements.

DETAILED DESCRIPTION

Figure 1:
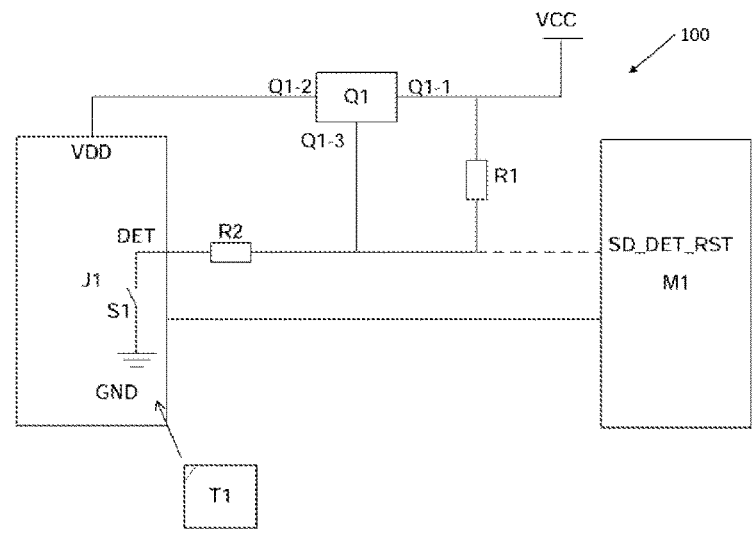
FIG. 1 shows a schematic diagram of an electronic device according to one or more embodiments of the present disclosure.

Embodiments of the present disclosure will be described in detail below. Examples of the embodiments are shown in the accompanying drawings, where the same or similar reference numerals always indicate the same or similar elements or elements with the same or similar functions. The embodiments described below with reference to the accompanying drawings are illustrative, which are only used to explain the present disclosure, and cannot be understood as a limitation to the present disclosure.

Unless otherwise defined, the technical terms or scientific terms used here should be the ordinary meanings understood by those of ordinary skill in the field of the present disclosure. In the description of the present disclosure, it should be understood that an orientation or positional relationship indicated by the terms "center," "longitudinal," "lateral," "upper," "lower," "front," "rear," "left," "right," "vertical," "horizontal," "top," "bottom," "inner," "outer," etc. is an orientation or positional relationship shown based on the accompanying drawings, is only for the convenience of describing the present disclosure and simplifying the description, rather than indicating or implying that a device or element referred to must have a specific orientation or be constructed and operated in a specific orientation, and therefore cannot be understood as a limitation to the present disclosure. In addition, the terms "first" and "second" are only for the purpose of description, and may not be understood as indicating or implying the relative importance.

The present disclosure provides an electronic device. A memory card slot of the electronic device has a detection pin. When a memory card is received in the memory card slot, the detection pin of the memory card slot is in a grounded state. When there is no memory card in the memory card slot, the detection pin of the memory card slot is in a non-grounded state. The detection pin of the memory card slot is configured to be connected with the switch element, and can control the state of the switch element. The detection pin in the grounded state can turn on the switch element, and the detection pin in the non-grounded state can turn off the switch element. In the on state of the switch element, the power supply pin of the memory card slot is electrically connected to the power supply; and in the off state of the switch element, the power supply pin of the memory card slot is disconnected from the power supply.

Therefore, a power lead of the memory card slot of the electronic device of the present disclosure is charged only when there is a memory card in the memory card slot. That is, when there is no memory card in the memory card slot, the memory card slot is in an uncharged state. This eliminates ESD caused by the memory card slot being charged when there is no memory card in the memory card slot, and improves the anti-static capacity of the electronic device.

In some embodiments according to the present disclosure, the controller of the electronic device includes a detection and reset pin, and the detection and reset pin is connected to (a third end of) the switch element. In an abnormal reading state where the controller cannot read data from a memory card in the memory card slot (such as an abnormal reading state caused by the ESD), the controller applies a high level to (the third end of) the switch element through the detection and reset pin. The high level can make the switch element be in an off state for a short time (even if the memory card is in the memory card slot), and the memory card is reset, so that the electronic device can be restored to a normal reading state. In the present disclosure, the electronic device can be automatically restored from the abnormal reading state to the normal reading state through a simple and low-cost circuit structure, which improves the anti-static capacity of the electronic device.

FIG. 1 shows a schematic diagram of an electronic device 100 according to one or more embodiments of the present disclosure. The electronic device 100 includes a power supply VCC, a memory card slot J1, a switch element Q1, and a controller M1. The memory card T1 is detachably inserted into the memory card slot J1. The memory card T1 may be any suitable memory card, such as a TF card or an SD card, and the memory card slot J1 is a slot corresponding to the memory card T1. The controller M1 is connected to the memory card slot J1. Specifically, a plurality of pins of the controller M1 are connected to a plurality of pins of the memory card slot (only one connection line is shown in the figure) to communicate with the memory card T1 received in the memory card slot J1 and read data from the memory card T1. The electronic device 100 also includes a power supply VCC and a switch element Q1. The switch element Q1 includes a first end Q1-1, a second end Q1-2, and a third end Q1-3. The switch element Q1 has an on state and an off state. In the on state of the switch element Q1, the first end Q1-1 and the second end Q1-2 of the switch element Q1 are electrically connected. In the off state of the switch element Q1, the first end Q1-1 and the second end Q1-2 of the switch element Q1 are disconnected. A voltage state of the third end Q1-3 of the switch element Q1 can control the state of the switch element Q1. In some embodiments, when the third end Q1-3 of the switch element Q1 is at a high level, the switch element Q1 is in the off state, and when the third end Q1-3 of the switch element is at a low level, the switch element Q1 is in the on state. The first end Q1-1 of the switch element Q1 is electrically connected to the power supply VCC.

The memory card slot J1 includes a power supply pin VDD and a detection pin DET. The power supply pin VDD of the memory card slot J1 is electrically connected to the second end Q1-2 of the switch element Q1, and the detection pin DET of the memory card slot J1 is electrically connected to the third end Q1-3 of the switch element Q1. The third end Q1-3 of the switch element Q1 is also electrically connected to the power supply VCC through a resistor R1.

The detection pin DET of the memory card slot J1 is grounded through a switch S1. The switch S1 is a mechanical switch, which is in a normally on state. When the memory card T1 is inserted into the memory card slot J1, the memory card T1 is engaged with the switch S1 to move the switch S1 to its on position, so that the detection pin DET of the memory card slot J1 is grounded. When the memory card T1 is removed from the memory card slot J1, the switch S1 is restored to its off position such as by a spring (not shown), so that the detection pin DET is not grounded.

During the use of the electronic device 100, when there is no memory card T1 in the memory card slot J1, the switch S1 is in the off state, so the detection pin DET of the memory card slot J1 is not grounded. At this time, since the third end Q1-3 of the switch element Q1 is electrically connected to the power supply VCC through the resistor R1, the third end Q1-3 of the switch element Q1 is at a high level. Therefore, the switch element Q1 is in the off state, the power supply pin VDD of the memory card slot J1 and the power supply VCC are disconnected, and the power supply VCC does not supply power to the memory card slot J1. When the memory card T1 is inserted into the memory card slot J1, the memory card T1 is engaged with the switch S1 to move the switch S1 to its on position, so that the detection pin DET is grounded. Since a resistance value of the resistor R2 is much less than that of the resistor R1, the third end Q1-3 of the switch element Q1 is at a low level. In some other embodiments according to the present disclosure, the electronic device 100 may not include the resistor R2. At this time, the third end Q1-3 of the switch element Q1 is at a ground level. Since the third end Q1-3 of the switch element Q1 is at the low level or the ground level, the switch element Q1 is in the on state, and the power supply VCC is electrically connected to the power supply pin VDD of the memory card slot J1, thereby supplying power to the memory card slot J1.

Therefore, in the electronic device 100 of the present disclosure, the power supply pin VDD of the memory card slot J1 is charged only when the memory card T1 is inserted into the memory card slot J1. That is, when there is no memory card T1 in the memory card slot J1, the memory card slot J1 is in an uncharged state. This eliminates ESD caused by the memory card slot J1 being charged when there is no memory card in the memory card slot J1, and improves the anti-static capacity of the electronic device.

In another one or more embodiments of the present disclosure, the controller M1 includes a detection and reset pin SD_DET_RST, and the detection and reset pin SD_DET_RST is electrically connected to the third end Q1-3 of the switch element Q1. Since the detection and reset pin SD_DET_RST is electrically connected to the third end Q1-3 of the switch element Q1, and further is electrically connected to the detection pin DET of the memory card slot J1, the controller M1 can detect the level of the detection pin DET of the memory card slot J1 through the detection and reset pin SD_DET_RST, thus determining whether there is a memory card in the memory card slot J1. As shown in FIG. 1, the electrical connection between the detection and reset pin SD_DET_RST of the controller M1 and the third end Q1-3 of the switch element Q1 is represented by a dotted line. The dotted line here indicates that this connection is not necessary. That is, in some embodiments, no pin of the controller M1 is electrically connected to the third end Q1-3 of the switch element Q1.

During normal operation of the electronic device 100 according to the present disclosure, the controller M1 can read data from the memory card T1 in the memory card slot J1 through the connection between the controller M1 and the memory card slot J1. At this time, the electronic device 100 is in a normal reading state. In some abnormal states of the electronic device 100, for example, after the memory card T1 or the memory card slot J1 of the electronic device 100 is subjected to ESD, the memory card T1 may be in an abnormal state. At this time, the controller M1 cannot read data from the memory card T1 in the memory card slot J1 through the connection between the controller M1 and the memory card slot J1, and the electronic deice 100 is in an abnormal reading state. In some embodiments, when the controller M1 sends a read command to the memory card slot J1 but normal data cannot be read from the memory card slot J1 and the memory card T1 therein within a predetermined time (for example, 1 s), the controller M1 determines that the electronic device is in the abnormal reading state. In some other embodiments, the controller M1 may determine that the electronic device is in the abnormal reading state through any suitable method.

In existing electronic devices, when an electronic device is in the abnormal reading state, the electronic device cannot work normally. At this time, a user usually needs to manually restart the electronic device to make the electronic device re-enter the normal working state. This brings inconvenience to the user of the electronic device and reduces the user experience of the electronic device.

In some embodiments according to the present disclosure, when the controller M1 detects that the electronic device is in the abnormal reading state, the controller M1 outputs a high level through the detection and reset pin SD_DET_RST, and the high level can be maintained for a continuous period of time t. At this time, although the detection pin DET of the memory card slot J1 is grounded, the third end Q1-3 of the switch element Q1 is still at a high level. Therefore, the switch element Q1 is in the off state within the continuous period of time t, and the power supply pin VDD of the memory card slot J1 and the power supply VCC are also disconnected from each other. After the continuous period of time t, the controller M1 no longer outputs a high level through the detection and reset pin SD_DET_RST. Since the detection pin DET of the memory card slot J1 is grounded, the third end Q1-3 of the switch element Q1 returns to a low level, the power supply pin VDD of the memory card slot J1 is electrically connected to the power supply VCC again, and VCC supplies power to the memory card T1 again.

That is, after the controller M1 detects the abnormal reading state, the memory card T1 is disconnected from the power supply VCC and is electrically reconnected to the power supply VCC after the continuous period of time t, so the memory card T1 is reset. After the memory card T1 is reset, the controller M1 can continuously read data from the memory card T1 in the memory card slot J1 through the connection between the controller M1 and the memory card slot J1, and the electronic deice 100 returns to the normal reading state.

Therefore, in the electronic device 100 according to the present disclosure, after the abnormal reading state, the controller M1 outputs a high level (for the continuous period of time t) to a restart pin SD_DET_RST, so that the memory card T1 is reset and the electronic device 100 is restored to the normal reading state. Compared with existing methods (which usually includes: (1) well separating a digital ground, an analog ground, and a power ground of a circuit of the memory card slot; (2) adding ESD elements; and (3) adding magnetic bead elements) the present disclosure has a simple circuit structure and low cost and can effectively improve the anti-static capacity of the electronic device.

Figure 2:
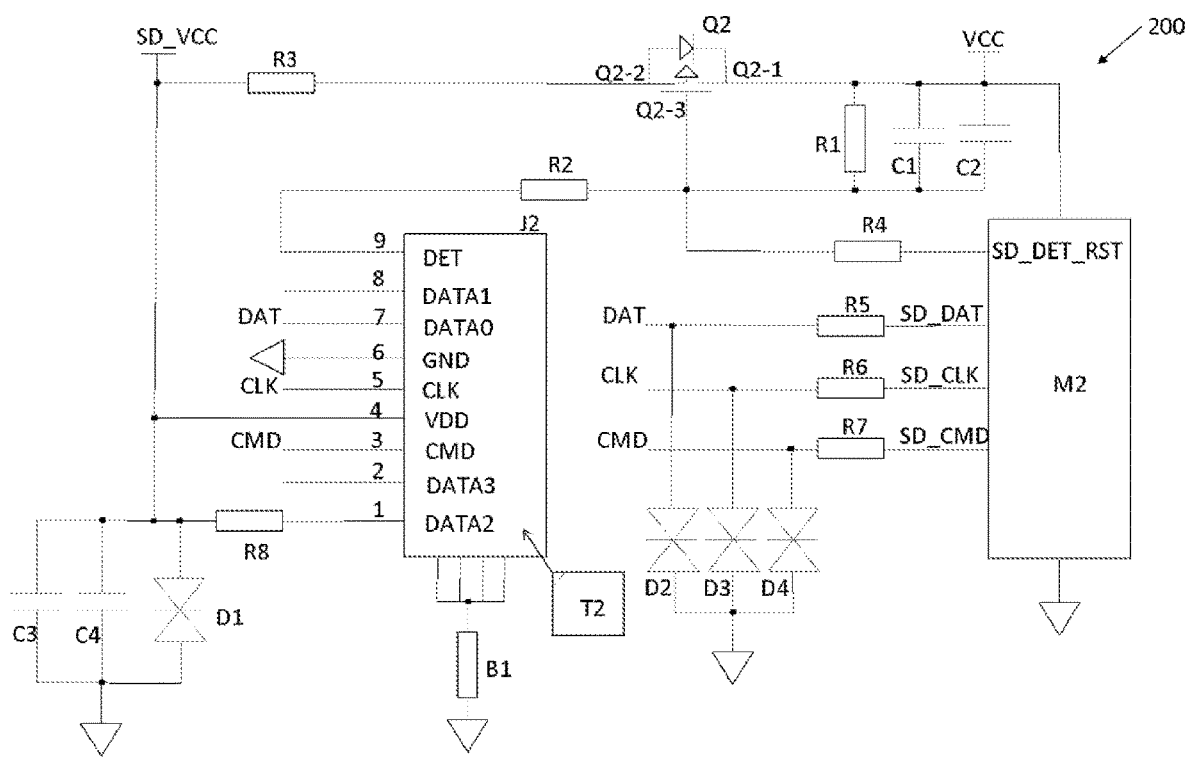
FIG. 2 shows a schematic diagram of an electronic device according to another one or more embodiments of the present disclosure.

FIG. 2 shows a schematic diagram of an electronic device 200 according to another one or more embodiments of the present disclosure. The electronic device 200 includes a power supply VCC, a memory card slot J2, a switch element Q2, and a controller M2. The electronic device 200 (including the power supply VCC, the memory card slot J2, the switch element Q2, and the controller M2) is similar to the electronic device 100 in many aspects, so many descriptions about the electronic device 100 above can be applied to the electronic device 200 of FIG. 2, which will not be described in detail here.

As shown in FIG. 2, the memory card slot J2 includes nine pins, pins 1 to 8 are respectively DATA2, DATA3, CMD, VDD, CLK, GND, DATA0, DATA1, and pin 9 is DET.

When a memory card T2 is inserted into the memory card slot J2, pins 1 to 8 of the memory card slot J2 are engaged with and electrically communicated with eight corresponding contacts of the memory card T2. A plurality of pins of the controller M2 are connected to a plurality of pins of the memory card slot J2 to communicate with the memory card in the memory card slot J2 and read data from the memory card. In the embodiment shown in the figure, the three pins SD_DAT, SD_CLK, and SD CMD of the controller M2 are respectively connected to the three pins DATA0, CLK, and CMD of the memory card slot J2.

In the electronic device 200, the switch element Q2 is a field effect transistor. The first end Q1-1 of the switch element Q2 is a source; the second end Q2-2 is a drain; and the third end Q2-3 is a gate. Since the first end Q1-1 of the switch element Q2 is connected to the power supply VCC, it is always at a high level. When the third end Q2-3 of the switch element Q2 is at a low level, the switch element Q2 is in an on state, and at this time, the first end Q2-1 and the second end Q2-2 of the switch element Q2 are electrically connected. When the third end Q2-3 of the switch element Q2 is at a high level, the switch element Q2 is in an off state, and at this time, the first end Q2-1 and the second end Q2-2 of the switch element Q2 are not connected.

When the switch element Q2 is in the on state, the power supply VCC of the electronic device 200 is electrically connected to the power supply pin VDD of the memory card slot J2, thereby supplying power to the memory card slot J2. When the switch element Q2 is in the off state, the power supply VCC and the power supply pin VDD of the memory card slot J2 are not connected.

The detection pin DET of the memory card slot J2 is grounded through a switch (not shown in FIG. 2). The switch is a mechanical switch, which is in a normally on state. When the memory card T2 is inserted into the memory card slot J2, the memory card T2 is engaged with the switch to move the switch to its on position, so that the detection pin DET is grounded. When the memory card T2 is removed from the memory card slot J2, the switch is restored to its off position such as by a spring (not shown), so that the detection pin DET is not grounded.

During the use of the electronic device 200, when there is no memory card T2 in the memory card slot J2, the switch of the pin DET is in the off state, and the detection pin DET of the memory card slot J2 is not grounded. At this time, the third end Q2-3 of the switch element Q2 is at a high level. Therefore, the switch element Q2 is in the off state, and the power supply pin VDD of the memory card slot J2 and the power supply VCC are disconnected. When the memory card T2 is inserted into the memory card slot J2, the memory card T2 is engaged with the switch of the pin DET to move the switch to its on position, so that the detection pin DET is grounded. Since a resistance value of the resistor R2 is much less than that of the resistor R1, the third end Q2-3 of the switch element Q2 will be at a low level. Since the third end Q2-3 of the switch element Q2 is at a low level, the switch element Q2 is in the on state. At this time, the power supply VCC is electrically connected to the power supply pin VDD of the memory card slot J2, thereby supplying power to the memory card slot J2.

Therefore, in the electronic device 200 of the present disclosure, the power supply pin VDD of the memory card slot J2 is charged only when the memory card T2 is inserted into the memory card slot J2. This eliminates ESD caused by the memory card slot J2 being charged when there is no memory card in the memory card slot J2 and improves the anti-static capacity of the electronic device.

As shown in the figure, the controller M2 also includes a detection and reset pin SD_DET_RST. The detection and reset pin SD_DET_RST are electrically connected to the third end Q2-3 of the switch element Q2 through a resistor R4. Therefore, the controller M2 can detect level changes of the third end Q2-3 of the switch element Q2 and the detection pin DET of the memory card slot J2 through the detection and reset pin SD_DET_RST, thereby determining whether there is a memory card in the memory card slot J1. In some other embodiments of the present disclosure, the controller M2 may not include the detection and reset pin SD_DET_RST.

During normal operation of the electronic device 200 according to the present disclosure, when the memory card T2 is inserted into the memory card slot J2, the controller M2 can read data from the memory card T2. At this time, the electronic device 200 is in a normal reading state. In some abnormal states of the electronic device, for example, after the memory card T2 or the memory card slot J2 of the electronic device is subjected to ESD, the memory card T2 may be in an abnormal state. The controller M2 cannot read data from the memory card T2. At this time, the electronic device is in an abnormal reading state.

In some embodiments according to the present disclosure, when the controller M2 detects that the electronic device is in the abnormal reading state, the controller M2 outputs a high level through the detection and reset pin SD_DET_RST, and the high level can be maintained for a continuous period of time t. At this time, although the detection pin DET of the memory card slot J2 is grounded, the third end Q2-3 of the switch element Q2 is at a high level since a resistance value of the resistor R2 is much greater than that of the resistor R4. Therefore, the switch element Q2 is in the off state within the continuous period of time t, and the power supplied to the power supply pin VDD of the memory card slot J2 is cut off. After the continuous period of time t, the controller M2 no longer outputs a high level through the detection and reset pin SD_DET_RST. At this time, since the detection pin DET of the memory card slot J2 is grounded, the third end Q2-3 of the switch element Q2 returns to a low level, and the power supply pin VDD of the memory card slot J2 is electrically connected to the power supply VCC again, that is, VCC supplies power to the memory card T2 again.

That is, after the controller M2 detects the abnormal reading state, the power supplied from the power supply VCC to the memory card slot J2 and the memory card T2 is cut off, and is restored after the period of time t, so that the memory card T2 is reset. After the memory card T2 is reset, the controller M2 can continuously read data from the memory card T2 in the memory card slot J2 through the connection between the controller M2 and the memory card slot J2. At this time, the electronic device returns to a normal reading state.

Therefore, in the electronic device 200 according to the present disclosure, after the abnormal reading state, the controller M2 outputs a high level (for the continuous period of time 1) to a restart pin SD_DET_RST, so that the memory card T2 is reset, and the electronic device is restored to the normal reading state. In the present disclosure, the anti-static capacity of the electronic device is improved through a simple and low-cost circuit structure.

The electronic device 200 also includes a plurality of ESD elements D1-D4. As shown in FIG. 2, the power supply pin VDD of the memory card slot J2 is grounded through ESD element D1. The pins DATA0, CLK, and CMD of the memory card slot J2 connected to the controller M2 are respectively grounded through ESD elements D2, D3, and D4. ESD elements D1 to D4 can further enhance the anti-static capacity of the electronic device 200. In some embodiments according to the present disclosure, ESD elements D1 to D4 are ESD tubes. The electronic device 200 further includes a magnetic bead B1, and a metal shell of the memory card slot J2 is grounded through the magnetic bead B1. The magnetic bead B1 can suppress high-frequency signal interference.

In the embodiment shown in FIG. 2, the memory card slot J2 includes nine pins, eight of which are engaged with corresponding contacts of the memory card in the memory card slot J2. Three of the eight pins are connected to three corresponding pins of the controller M2 for communication between the memory card T2 in the memory card slot J2 and the controller M2. In some other embodiments according to the present disclosure, the memory card slot J2 may have different numbers of pins for engagement and electrical connection with the corresponding number of contacts of the memory card slot T2. In some other embodiments of the present disclosure, the number of pins connected between the memory card slot and the controller for communication between the memory card and the controller may be any suitable number.

The controller of the embodiment of the present disclosure can be any suitable controller, such as a CPU, an MCU, a single-chip microcomputer, a microprocessor, and the like. The electronic device according to the embodiment of the present disclosure may be any electronic device including a memory card slot, including an audio player, a video player, a camera, a mobile phone, and the like. In some other embodiments according to the present disclosure, the electronic device may be memory card slot devices of these electronic devices.

The present disclosure can be realized in the following ways:

Item 1: An electronic device, comprising:
a switch element; and
a memory card slot suitable for receiving a memory card, the memory card slot comprising a power supply pin and a detection pin, and the power supply pin of the memory card slot being connected to a power supply through the switch element,
wherein the memory card slot has a first configuration in which a memory card is received and a second configuration in which there is no memory card; in the first configuration of the memory card slot, the detection pin of the memory card slot is in a grounded state, and in the second configuration of the memory card slot, the detection pin of the memory card slot is in a non-grounded state,
wherein the detection pin of the memory card slot is connected to the switch element, the detection pin in the grounded state can turn on the switch element, and the detection pin in the non-grounded state can turn off the switch element; in the on state of the switch element, the power supply pin of the memory card slot is electrically connected to the power supply; and in the off state of the switch element, the power supply pin of the memory card slot is not electrically connected to the power supply.

Item 2: The electronic device according to item 1, wherein the switch element has a first end, a second end, and a third end; the first end of the switch element is electrically connected to the power supply; the second end of the switch element is electrically connected to the power supply pin of the memory card slot; and the third end of the switch element is electrically connected to the detection pin of the memory card slot;
wherein in the on state of the switch element, the first end of the switch element is electrically connected to the second end, and in the off state of the switch element, the first end of the switch element is not electrically connected to the second end;
wherein when the third end of the switch element is at a low level, the switch element is in the on state, and when the third end of the switch element is at a high level, the switch element is in the off state.

Item 3: The electronic device according to any one of the above items, wherein the power supply is electrically connected to the third end of the switch element through a resistor.

Item 4: The electronic device according to any one of the above items, wherein the switch element is a field effect transistor; the first end of the switch element is a source; the second end is a drain; and the third end is a gate.

Item 5: The electronic device according to any one of the above items, wherein the detection pin of the memory card slot is grounded through a switch; in the first configuration of the memory card slot, the memory card in the memory card slot puts the switch at the on position; and in the second configuration of the memory card slot, the switch is at the off position.

Item 6: The electronic device according to any one of the above items, wherein the electronic device further comprises a controller connected with the memory card slot and capable of reading data from the memory card in the memory card slot.

Item 7: The electronic device according to any one of the above items, wherein the controller comprises a detection and reset pin; the detection and reset pin is connected to the third end of the switch element; the controller comprises a normal reading state of being able to read data from the memory card in the memory card slot, and an abnormal reading state of being unable to read data from the memory card in the memory card slot; and in the abnormal reading state, the controller applies a high level to the third end of the switch element through the detection and reset pin.

Item 8: The electronic device according to any one of the above items, wherein the memory card slot is a slot suitable for receiving a TF card or an SD card.

Item 9: The electronic device according to any one of the above items, wherein the electronic device is a portable audio player or video player.

Item 10: The electronic device according to any one of the above items, wherein the controller is connected to a plurality of pins of the memory card slot, and is used to communicate with the memory card in the memory card slot through the plurality of pins; the electronic device also comprises a plurality of electrostatic discharge (ESD) elements; each of the plurality of pins of the memory card slot is grounded through one of the ESD elements, and/or the power supply pin of the memory card slot is grounded through one of the ESD elements.

The foregoing descriptions are merely example embodiments adopted to illustrate the principles of the present disclosure and are not used to limit the protection scope of the present disclosure. For those of ordinary skill in the art, various modifications and improvements can be made without departing from the spirit and essence of the present disclosure, and these modifications and improvements are also within the protection scope of the present disclosure.

What is claimed is:

1. An electronic device comprising:
   a switch element; and
   a memory card slot suitable to receive a memory card, the memory card slot comprising a power supply pin and a detection pin, and the power supply pin of the memory card slot being connected to a power supply through the switch element,
   wherein the memory card slot includes a first configuration in which a memory card is received and a second configuration in which there is no memory card; in the first configuration of the memory card slot, the detection pin of the memory card slot is in a grounded state, and in the second configuration of the memory card slot, the detection pin of the memory card slot is in a non-grounded state,
   wherein the detection pin of the memory card slot is connected to the switch element and the detection pin in the grounded state turns on the switch element,
   wherein the detection pin in the non-grounded state turns off the switch element;
   wherein, in the on state of the switch element, the power supply pin of the memory card slot is electrically connected to the power supply;
   wherein, in the off state of the switch element, the power supply pin of the memory card slot is not electrically connected to the power supply;
   wherein the switch element has a first end, a second end, and a third end; the first end of the switch element is electrically connected to the power supply; the second end of the switch element is electrically connected to the power supply pin of the memory card slot; and the third end of the switch element is electrically connected to the detection pin of the memory card slot;
   wherein in the on state of the switch element, the first end of the switch element is electrically connected to the second end, and in the off state of the switch element, the first end of the switch element is not electrically connected to the second end;
   wherein, responsive to the third end of the switch element being at a low level, the switch element is in the on state, and responsive to the third end of the switch element being at a high level, the switch element is in the off state;
   wherein the electronic device further comprises a controller connected with the memory card slot and capable of reading data from the memory card in the memory card slot; and
   wherein the controller comprises a detection and reset pin; the detection and reset pin is connected to the third end of the switch element; the controller comprises a normal reading state to read data from the memory card in the memory card slot, and an abnormal reading state of not reading data from the memory card in the memory card slot; and in the abnormal reading state, the controller applies a high level to the third end of the switch element through the detection and reset pin.

2. The electronic device according to claim 1, wherein the power supply is electrically connected to the third end of the switch element through a resistor.

3. The electronic device according to claim 1, wherein the switch element is a field effect transistor (FET); the first end of the switch element is a source; the second end is a drain; and the third end is a gate.

4. The electronic device according to claim 1, wherein the controller is connected to a plurality of pins of the memory card slot, and is used to communicate with the memory card in the memory card slot through the plurality of pins; wherein the electronic device also comprises a plurality of electrostatic discharge (ESD) elements; and wherein at least one of each of the plurality of pins of the memory card slot is grounded through one of the ESD elements and the power supply pin of the memory card slot is grounded through one of the ESD elements.

5. The electronic device according to claim 1, wherein the detection pin of the memory card slot is grounded through a switch; wherein in the first configuration of the memory card slot, the memory card in the memory card slot positions the switch at an on position; and wherein in the second configuration of the memory card slot, the switch is positioned at an off position.

6. The electronic device according to claim 1, wherein the memory card slot is a slot suitable for receiving a TransFlash (TF) cards or a Secure Digital (SD) card.

7. The electronic device according to claim 1, wherein the electronic device is a portable audio player or video player.

8. An electronic device comprising:
   a switch element; and
   a memory card slot receiving a memory card, the memory card slot comprising a power supply pin and a detection pin, and the power supply pin of the memory card slot being connected to a power supply through the switch element,
   wherein the memory card slot includes a first configuration in which a memory card is received and a second configuration in which there is no memory card; in the first configuration of the memory card slot, the detection pin of the memory card slot is in a grounded state, and in the second configuration of the memory card slot, the detection pin of the memory card slot is in a non-grounded state,
   wherein the detection pin in the non-grounded state turns off the switch element;
   wherein, in the on state of the switch element, the power supply pin of the memory card slot is electrically connected to the power supply;
   wherein, in the off state of the switch element, the power supply pin of the memory card slot is not electrically connected to the power supply;
   wherein the switch element has a first end, a second end, and a third end; the first end of the switch element is electrically connected to the power supply; the second end of the switch element is electrically connected to the power supply pin of the memory card slot; and the third end of the switch element is electrically connected to the detection pin of the memory card slot;
   wherein in the on state of the switch element, the first end of the switch element is electrically connected to the second end, and in the off state of the switch element, the first end of the switch element is not electrically connected to the second end;
   wherein, responsive to the third end of the switch element being at a low level, the switch element is in the on state, and responsive to the third end of the switch element being at a high level, the switch element is in the off state;

wherein the electronic device further comprises a controller connected with the memory card slot and capable of reading data from the memory card in the memory card slot; and wherein the controller comprises a detection and reset pin; the detection and reset pin is connected to the third end of the switch element; the controller comprises a normal reading state to read data from the memory card in the memory card slot, and an abnormal reading state of not reading data from the memory card in the memory card slot; and in the abnormal reading state, the controller applies a high level to the third end of the switch element through the detection and reset pin.

9. The electronic device according to claim 8 wherein the power supply is electrically connected to the third end of the switch element through a resistor.

10. The electronic device according to claim 8 wherein the switch element is a field effect transistor (FET); the first end of the switch element is a source; the second end is a drain; and the third end is a gate.

11. The electronic device according to claim 8, wherein the controller is connected to a plurality of pins of the memory card slot, and is used to communicate with the memory card in the memory card slot through the plurality of pins; wherein the electronic device also comprises a plurality of electrostatic discharge (ESD) elements; and wherein at least one of each of the plurality of pins of the memory card slot is grounded through one of the ESD elements or the power supply pin of the memory card slot is grounded through one of the ESD elements.

12. The electronic device according to claim 8, wherein the detection pin of the memory card slot is grounded through a switch; wherein in the first configuration of the memory card slot, the memory card in the memory card slot positions the switch at an on position; and wherein in the second configuration of the memory card slot, the switch is positioned at an off position.

13. The electronic device according to claim 8, wherein the memory card slot is a slot suitable for receiving a TransFlash (TF) cards or a Secure Digital (SD) card.

14. An electronic device comprising:
a switch element; and
a memory card slot suitable to receive a memory card, the memory card slot comprising a power supply pin and a detection pin, and the power supply pin of the memory card slot being connected to a power supply through the switch element, wherein the memory card slot includes a first configuration in which a memory card is received and a second configuration in which there is no memory card; in the first configuration of the memory card slot, the detection pin of the memory card slot is in a grounded state, and in the second configuration of the memory card slot, the detection pin of the memory card slot is in a non-grounded state, wherein the detection pin of the memory card slot is connected to the switch element and the detection pin in the grounded state turns on the switch element, wherein, in the on state of the switch element, the power supply pin of the memory card slot is electrically connected to the power supply;

wherein, in the off state of the switch element, the power supply pin of the memory card slot is not electrically connected to the power supply;

wherein the switch element has a first end, a second end, and a third end; the first end of the switch element is electrically connected to the power supply; the second end of the switch element is electrically connected to the power supply pin of the memory card slot; and the third end of the switch element is electrically connected to the detection pin of the memory card slot;

wherein in the on state of the switch element, the first end of the switch element is electrically connected to the second end, and in the off state of the switch element, the first end of the switch element is not electrically connected to the second end;

wherein, responsive to the third end of the switch element being at a low level, the switch element is in the on state, and responsive to the third end of the switch element being at a high level, the switch element is in the off state;

wherein the electronic device further comprises a controller connected with the memory card slot and capable of reading data from the memory card in the memory card slot; and wherein the controller comprises a detection and reset pin; the detection and reset pin is connected to the third end of the switch element; the controller comprises a normal reading state to read data from the memory card in the memory card slot, and an abnormal reading state of not reading data from the memory card in the memory card slot; and in the abnormal reading state, the controller applies a high level to the third end of the switch element through the detection and reset pin.

\* \* \* \* \*